(12) United States Patent
Yun-Xiu et al.

(10) Patent No.: US 7,095,158 B2
(45) Date of Patent: Aug. 22, 2006

(54) A/D CONVERTER WITH ADJUSTABLE INTERNAL CONNECTION AND METHOD FOR THE SAMEOPERATING

(75) Inventors: Li Yun-Xiu, Shanghai (CN); Wei Chen, Fuchou (CN); Yung-Wei Peng, Taoyuan County (TW)

(73) Assignee: DELTA Electronics, Inc., Taoyuan Hsien (TW)

( * ) Notice: Subject to any disclaimer, the term of this patent is extended or adjusted under 35 U.S.C. 154(b) by 330 days.

(21) Appl. No.: 10/709,373

(22) Filed: Apr. 30, 2004

(65) Prior Publication Data
US 2005/0157524 A1    Jul. 21, 2005

(30) Foreign Application Priority Data
Jan. 20, 2004    (TW) ............................... 93101484 A

(51) Int. Cl.
*H01L 41/107*    (2006.01)
*H02M 7/00*    (2006.01)
*G05F 5/00*    (2006.01)

(52) U.S. Cl. .................. 310/318; 363/65; 323/282; 323/284

(58) Field of Classification Search ................ 310/318; 363/65; 323/282, 284
See application file for complete search history.

(56) References Cited

U.S. PATENT DOCUMENTS

| | | | | |
|---|---|---|---|---|
| 4,459,505 A | * | 7/1984 | Lim | 310/318 |
| 5,654,605 A | * | 8/1997 | Kawashima | 310/316.01 |
| 6,943,785 B1 | * | 9/2005 | Chou et al. | 345/204 |
| 7,019,993 B1 | * | 3/2006 | Vazquez Carazo | 363/67 |
| 2003/0137221 A1 | * | 7/2003 | Radziemski et al. | 310/339 |

FOREIGN PATENT DOCUMENTS

| CA | 1649247 | * | 8/2005 |
|---|---|---|---|
| TW | 460899 B | * | 10/2001 |

* cited by examiner

*Primary Examiner*—Thomas M. Dougherty
(74) *Attorney, Agent, or Firm*—Jiang Chyun IP Office

(57) ABSTRACT

An A/D converter with adjustable internal connection and a method for operating the same are provided. The A/D converter comprises: a plurality of piezo-transforming devices for detecting an input voltage from the alternating current source and adjusting an connection of input terminals of the plurality of piezo-transforming devices based on the input voltage to obtain an input/output voltage ratio of the plurality of piezo-transforming devices inversely proportional to the input voltage.

8 Claims, 5 Drawing Sheets

A/D CONVERTER WITH ADJUSTABLE INTERNAL CONNECTION AND METHOD FOR THE SAMEOPERATING

CROSS REFERENCE TO RELATED APPLICATIONS

This application claims the priority benefit of Taiwan application serial no. 93101484, filed Jan. 20, 2004.

BACKGROUND OF INVENTION

1. Field of the Invention

This invention generally relates to an A/D converter with adjustable internal connection and a method for operating the same, and more particularly to an A/D converter with adjustable internal connection and a method for operating the same by using a plurality of piezoelectric transformers and the connection of those piezoelectric transformers input terminals are adjustable.

2. Description of Related Art

To reduce the usage of the chemical material, most electrical devices use direct current (DC) sources such as batteries as power sources and thus have A/D converters. Hence, those devices can use the alternating current (AC) sources provided by the electrical power companies. A traditional A/D converter uses a magnetic transformer to obtain a required DC voltage. However, due to the safety standard requirement, the secondary coils of this magnet transformer require a certain amount of distances between adjacent coils. This limitation makes the size impossible to be small. On the other hand, the piezoelectric transformer has the advantage of small size and good insulation. Hence, more and more researches focus on the application of the piezoelectric transformer. However, because the voltage standards adopted by different countries are different, an A/D converter with a single piezoelectric transformer cannot be universally used all over the world.

To resolve this problem, some manufacturers provide an improved A/D converter, which uses an active-clamp half-bridge circuit, pulse frequency modulation (PFM) and pulse width modulation (PWM) feedback controller to respond the different voltage input. However, the design of the controller is very complicated and costly, and thus cannot be adopted for mass-production.

SUMMARY OF INVENTION

Accordingly, the present invention is directed to an A/D converter with adjustable internal connection and operation method thereof by using a simple circuit design to provide the same output voltage even if the input voltage is different.

According to an embodiment of the present invention, an A/D converter with adjustable internal connection is provided for converting an alternating current source to a direct current source. The A/D converter comprises a rectifier driver module, a transformer module, a control module and an output rectifier module. The rectifier driver module is adapted for rectifying an input voltage from the alternating current source and converting the input voltage to a driver voltage corresponding to the input voltage. The transformer module includes a plurality of piezoelectric transformers, wherein each of the plurality of piezoelectric transformers has two input terminals and two output terminals. The two output terminals of the plurality of piezoelectric transformers connected in parallel to serve as two output terminals of the transformer module. The control module has an input terminal, which adapted for receiving the driver voltage. The control module is responsive to the input voltage for adjusting a connection between the input terminals of the plurality of piezoelectric transformers. The output rectifier module is adapted for receiving an output voltage from thetwo output terminals of the transformer module, and rectifying the output voltage from the two output terminals to output the direct current source.

In an embodiment of the present invention, the transformer module includes: a first piezoelectric transformer and a second piezoelectric transformer. The first positive input terminal comprises a first negative input terminal, a first positive output terminal and a first negative output terminal. The second piezoelectric transformer comprises a second positive input terminal, a second negative input terminal, a second positive output terminal and a second negative output terminal, wherein the first positive input terminal is coupled to the second positive input terminal and the first positive output terminal is coupled to the second positive output terminal.

In an embodiment of the present invention, the control module includes: a first switch, a second switch and a third switch. The first switch is coupled between the first positive input terminal and the second positive input terminal. The second switch is coupled between the first negative input terminal and the second negative input terminal. The third switch is coupled between the first negative input terminal and the second positive input terminal. When the input voltage reaches a first predetermined level, the first and second switches are off and the third switch is on, and when the input voltage reaches a second predetermined level, the first and second switches are on and the third switch is off.

In an embodiment of the present invention, the rectifier module includes: a rectifier and a driver. The rectifier is adapted for rectifying the input voltage to obtain a rectified voltage. The driver comprises a first inductor, a second inductor and a switch. The first inductor comprises a first terminal for receiving the rectified voltage and a second terminal is coupled to the input terminal of the control module. The second inductor comprises a first terminal for receiving the rectified voltage and a second terminal is coupled to a first terminal of the driver switch, and a second terminal of the driver is coupled to the input terminal of the control module. The driver switch is switched on/off responsive to the input voltage.

The present invention is related to a method of operating an A/D converter with adjustable internal connection, for converting an alternating current source to a direct current source. In the method of operating an A/D converter, according to an embodiment of the present invention, a plurality of piezo-transforming devices is provided. Next an input voltage from the alternating current source is detected. Next, an connection of input terminals of the plurality of piezo-transforming devices is adjusted based on the input voltage to obtain an input/output voltage ratio of the plurality of piezo-transforming devices inverse-proportional to the input voltage.

In an embodiment of the present invention, when the input voltage is higher than a predetermined voltage, connection of the number of the input terminals of the plurality of piezo-transforming devices is adjusted in a manner that an increased number of the input terminal of the plurality of piezo-transforming devices are connected in series; and when the input voltage is lower than the predetermined voltage, the connection of the number of the input terminals of the plurality of piezo-transforming devices is adjusted in a manner that an increased number of the input terminals of the plurality of piezo-transforming devices are connected in parallel.

According to an embodiment of the present invention, a plurality of piezoelectric transformers connected series and parallel utilized to provide the variance of the input/output voltage ratio in order to obtain the same or a similar voltage even if the input voltage is different. Hence, the present invention does not require a complicated circuitry such as active-clamp half-bridge circuit, pulse frequency modulation (PFM) or pulse width modulation (PWM) feedback controller to control the output. Therefore, the A/D converter with adjustable internal connection of the present invention is cost-effective and suitable for mass-production.

The above is a brief description of some deficiencies in the prior art and advantages of the present invention. Other features, advantages and embodiments of the invention will be apparent to those skilled in the art from the following description, accompanying drawings and appended claims.

DETAILED DESCRIPTION

Figure 1:
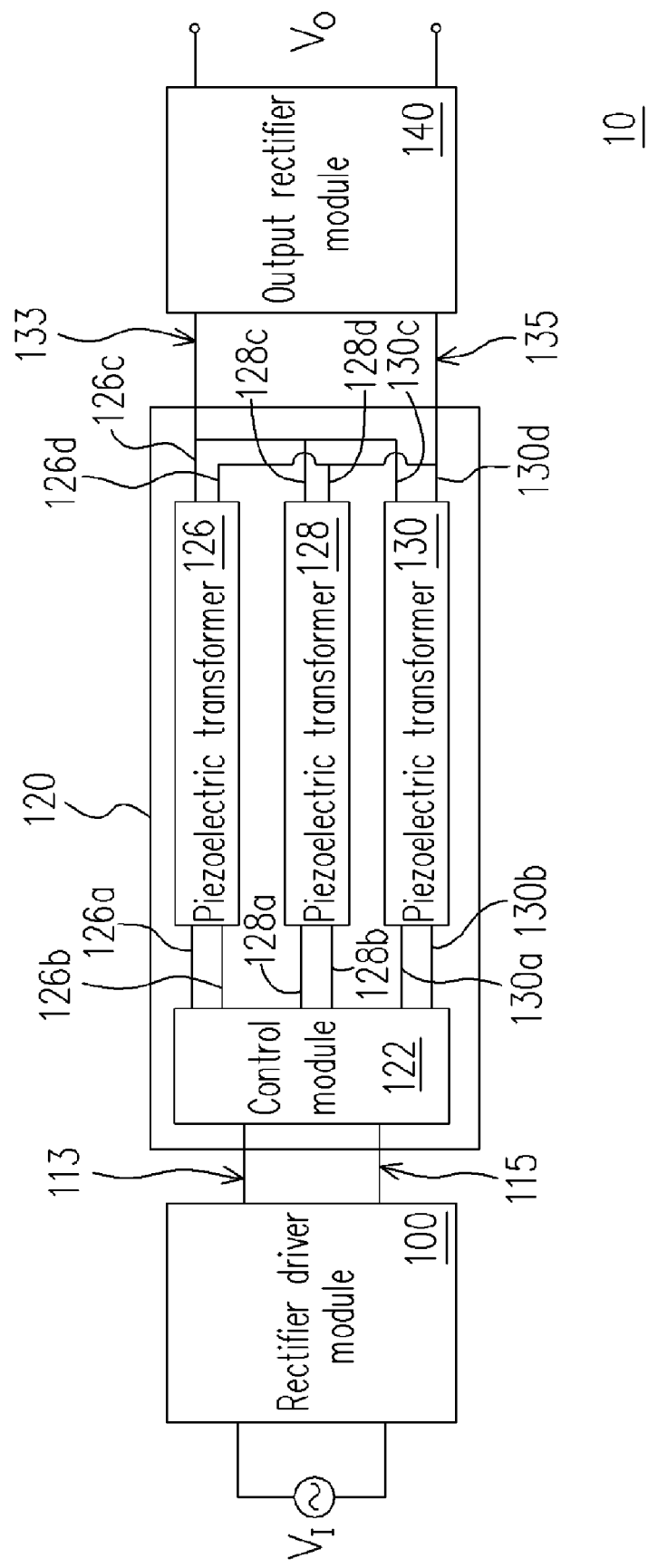
FIG. 1 is a block diagram of an A/D converter with adjustable internal connection in accordance with an embodiment of the present invention.

FIG. 1 is a block diagram of an A/D converter with adjustable internal connection in accordance with an embodiment of the present invention. In this embodiment, the A/D converter 10 includes a rectifier driver module 100, a transformer module 120, and an output rectifier module 140. The rectifier driver module 100 rectifies an input voltage from the alternating current source $V_I$ and converts the input voltage to a driver voltage corresponding to the input voltage. Then the rectifier driver module 100 outputs the driver voltage to the subsequent transformer module 120 via the nodes 113 and 115. After receiving the driver voltage, the transformer module 120 transforms the driver voltage and outputs it to the output rectifier module 140 via the nodes 133 and 135. Then the output rectifier module 140 rectifies the transformed driver voltage to be the direct current source $V_O$ for the electrical devices.

Referring to FIG. 1, the transformer module 120 includes a control module 122 and a plurality of piezoelectric transformers such as piezoelectric transformers 126, 128, and 130. Each of the piezoelectric transformers 126, 128, and 130 has two input terminals 126a and 126b, 128a and 128b, or 130a and 130b. Each piezoelectric transformer also has two output terminals 126c and 126d, 128c and 128d, and 130c and 130d. In addition, the output terminals of the piezoelectric transformers 126, 128, and 130 are connected in parallel to the two output terminals 133 and 135 of the transformer module 120. It should be noted that the parallel connection of the output terminals of the piezoelectric transformers 126, 128, and 130 means the connection of the same phase nodes, and has nothing too do with the real position of the nodes. Further, the control module 122 receives the driver voltage via the nodes 113 and 115 from the rectifier driver module and adjusts the connection between the input terminals of the piezoelectric transformers 126, 128, and 130 based on the input voltage from the AC source.

Figure 2:
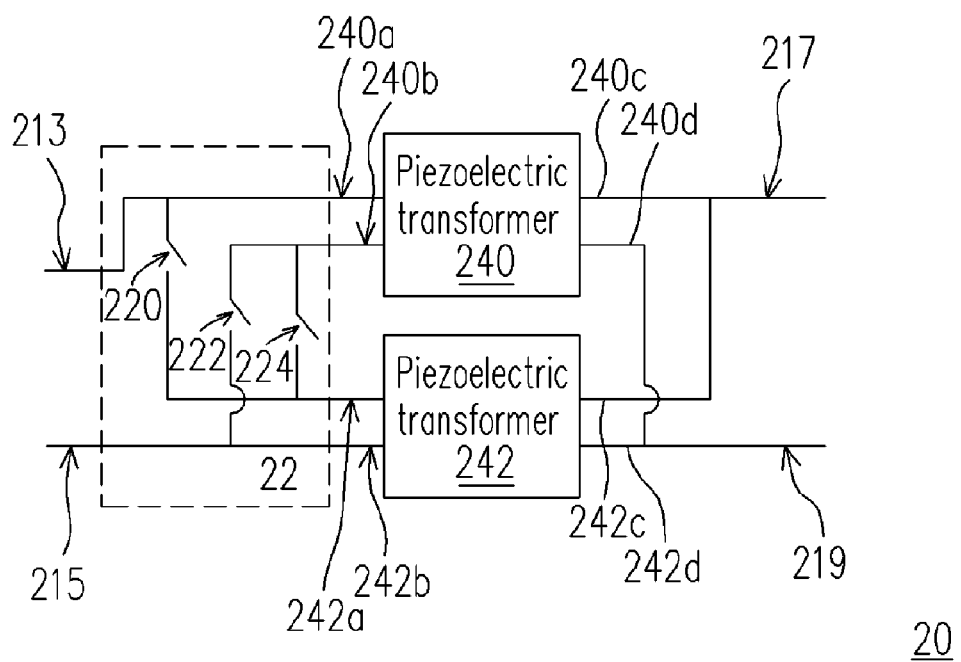
FIG. 2 is a block diagram of a transformer module in accordance with an embodiment of the present invention.

To further illustrate the present invention, the connection of the transformer module 120 in accordance with an embodiment of the present invention will be described as follows. FIG. 2 is a block diagram of a transformer module in accordance with an embodiment of the present invention. For simplicity, this embodiment uses two piezoelectric transformers 240 and 242 as an example to illustrate the present invention. It should be noted that more than two piezoelectric transformers may also be used to achieve the purpose of the present invention and therefore also fall within the scope of the present invention. Further, currently the well-adopted voltage standard includes 220V and 110V AC source. Hence, this embodiment uses these two standards to further illustrate the present invention.

In FIG. 2, the transformer module 20 includes a control module 22 and piezoelectric transformers 240 and 242. In the control module 22, the switch 220 is coupled to the input terminal 240a (or first positive input terminal) of the piezoelectric transformer 240 and the input terminal 242a (or second positive input terminal) of the piezoelectric transformer 242. The switch 222 is coupled to the input terminal 240b (or first negative input terminal) of the piezoelectric transformer 240 and the input terminal 242b (or second negative input terminal) of the piezoelectric transformer 242. The switch 224 is coupled to the input terminal 240b of the piezoelectric transformer 240 and the input terminal 242a of the piezoelectric transformer 242.

When the A/D converter with the transformer module 20 is applied in the areas using AC 220V and 110V voltage standards, the control module 22 has to change the status of the switches 220, 222, and 224 based on the areas. For example, when the AC source provides 220V as an input voltage, the control module 22 will turn off the switched 220 and 222 and turn on the switch 224. Hence, the input terminal 240a of the piezoelectric transformer 240 is coupled to the node 213 (i.e., the node 113 shown in FIG. 1). The input terminal 240b of the piezoelectric transformer 240 and the input terminal 242a of the piezoelectric transformer 242 are coupled together. The input terminal of the piezoelectric transformer is coupled to the node 215 (i.e., the node 115 shown in FIG. 1). By using the serial connection structure, the output/input voltage ratio of the piezoelectric transformers 240 and 242 is smaller than a single piezoelectric transformer with a double size.

In this present invention, the above connection is called serial connection. In other words, referring to FIG. 1, the definition of serial connection is that the output terminals of the piezoelectric transformers are connected in parallel. In order to form a serial connection, a first input terminal, which is a positive input terminal (ex. 126a) of a piezoelectric transformer; and a second input terminal, which is a negative input terminal (ex. 130b) of another piezoelectric transformer, are connected to node 113 and 115, respectively. Any other positive input terminals, such as 128a and 130a, are connected to other negative input terminals, such as 126b and 128b of different piezoelectric transformers individually.

Referring to FIG. 2, when the AC source provides 110V as an input voltage, the control module 22 will turn on the switched 220 and 222 and turn off the switch 224. Hence, the input terminal 240a of the piezoelectric transformer 240 and the input terminal 242a of the piezoelectric transformer 242 are coupled to the node 213; the input terminal 240b of the piezoelectric transformer 240 and the input terminal 242b of the piezoelectric transformer 242 are coupled to the node 215. By using the parallel connection structure, the output/input voltage ratio of the piezoelectric transformers 240 and 242 is larger than a single piezoelectric transformer with a double size.

Figure 3:
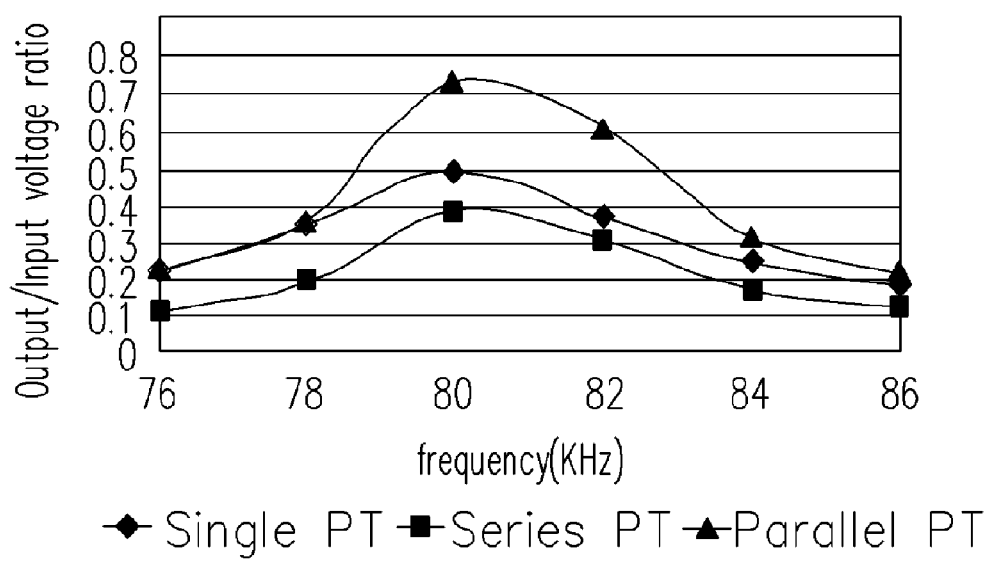
FIG. 3 shows the relationship of output/input voltage ratios and the frequency when a single piezoelectric transformer (but the size is the same as two piezoelectric transformers) is used, two piezoelectric transformers are connected in series, and two piezoelectric transformers are connected in parallel.

FIG. 3 shows the relationship of output/input voltage ratios and the frequency when a single piezoelectric transformer (but the size is the same as two piezoelectric transformers) is used, two piezoelectric transformers are series connected, and two piezoelectric transformers are connected in parallel. As shown in FIG. 3, the output/input voltage ratio of the single piezoelectric transformer is between that of the series-connected piezoelectric transformers and that of the parallel-connected piezoelectric transformers. Hence, in the present embodiment of the present invention, above relationship is utilized to maintain the DC voltage in a certain range based on the input AC voltage.

Figure 4:
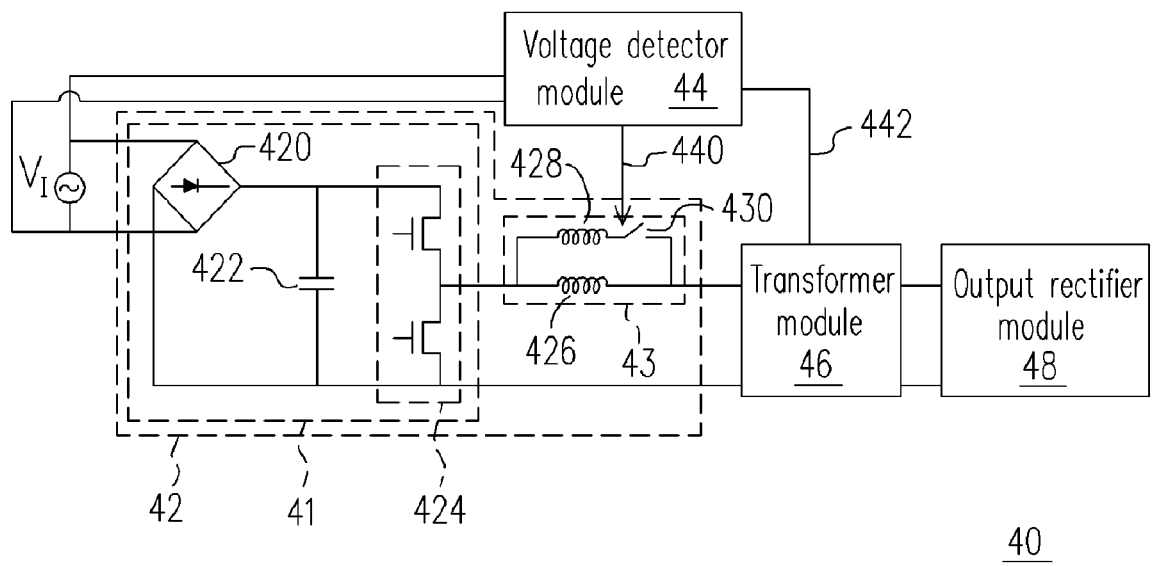
FIG. 4 is a block diagram of an A/D converter with adjustable internal connection in accordance with another embodiment of the present invention.

FIG. 4 is a block diagram of an A/D converter with adjustable internal connection in accordance with another embodiment of the present invention. Referring to FIG. 4, in this embodiment, the A/D converter 40 includes a rectifier driver 42, a voltage detector module 44, a transformer module 46 and an output rectifier module 48. Because the transformer module 46 has been illustrated above, the detailed description of the transformer module 46 is not repeated hereinafter. As shown in FIG. 4, the rectifier driver module 42 includes a rectifier device 41 including a diode bridge rectifier 420, a capacitor 422, and a half-bridge switch circuit 424, a driver 43 including two inductors 426 and 428 and a driver switch 430. The rectifier device 41 receives the input voltage from the AC source and rectifies it to obtain the rectified voltage. The rectified voltage is then sent to the driver 43. In the driver 43, the one terminal of the inductor 426 received the rectified voltage and the other terminal of the inductor 426 is coupled to the input terminal of the transformer module 46. Further, one terminal of the inductor 428 received the rectified voltage and the other terminal of the inductor 428 is coupled to one terminal of the driver switch 430. The other terminal of the driver switch 430 is coupled to the input terminal of the transformer module 46.

In this embodiment, the driver switch 430 determines whether to operate the circuit with the inductor 428. As illustrated above, the piezoelectric transformers of the transformer module 46 requires inductors with different resonant frequencies when connected in series or in parallel. To make transformer module 46 work smoothly, the driver 43 has to provide different resonant frequencies. The driver switch 430 provides this function by controlling whether or not to operate the circuit with the inductor 428. It should be noted that the voltage detector module 44 will generates a corresponding control signal to determine the operation of the transformer module 46 and the driver switch 430 based on the input voltage V from the AC source. However, this is not the only way to achieve the same purpose. One skilled in art may choose an adequate design under different circumstances.

Figure 5A:
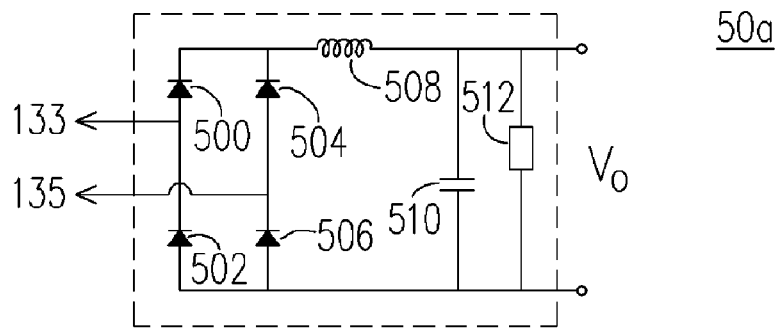
FIGS. 5A–5C show the circuits of the output rectifier modules in accordance with an embodiment of the present invention.
Figure 5B:
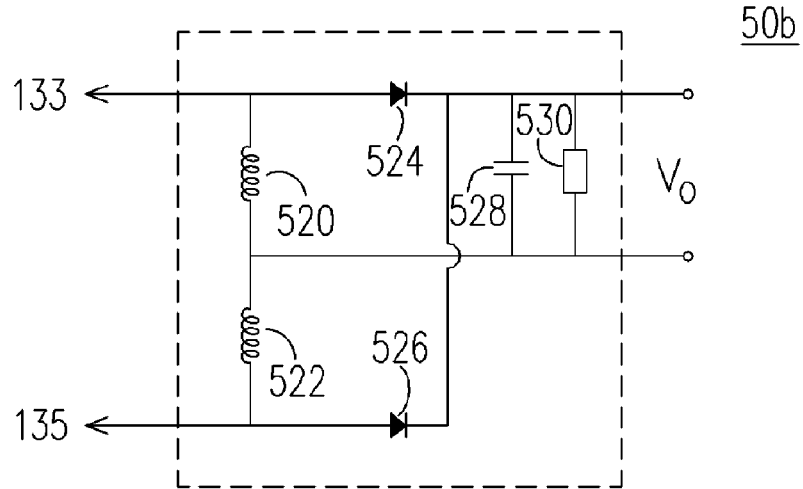
Figure 5C:
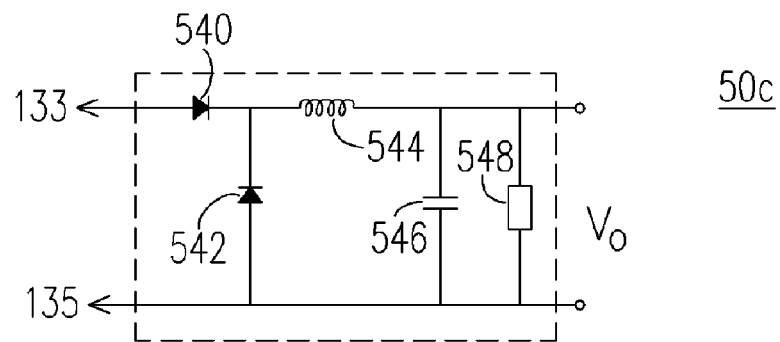

FIGS. 5A–5C show the circuits of the output rectifier modules in accordance with an embodiment of the present invention. In FIG. 5A, the anode of the diode 500 and the cathode of the diode 502 of the output rectifier module 50a are coupled to one input terminal of the output rectifier 50a (the node 133 of FIG. 1). The anode of the diode 504 and the cathode of the diode 506 of the output rectifier module 50a are coupled to the other input terminal of the output rectifier 50a (the node 135 of FIG. 1). Further, the cathodes of the diodes 500 and 504 are coupled to one terminal of the inductor 508 and the other terminal of the inductor 508 is coupled to one terminal of the capacitor 510 and the load 512. In addition, the anodes of the diodes 502 and 506 are coupled to the other terminal of the capacitor 510 and the load 512, which is not coupled to the inductor 508.

In FIG. 5B, one terminal of the inductor 520 of the output rectifier module 50b is coupled to the anode of the diode 524 and one input terminal of the output rectifier module 50b (the node 133 of FIG. 1). The other terminal of the inductor 520 is coupled to one terminal of the inductor 522, the capacitor 528 and the load 530. The other terminal of the inductor 522 is coupled to the anode of the diode 526 and the other input terminal of the output rectifier module 50b (the node 135 of FIG. 1). Further, the cathodes of the diodes 524 and 526 are coupled to one terminal of the capacitor 528 and the load 530, which is not coupled to the inductor 520.

In FIG. 5C, the anode of the diode 540 of the output rectifier module 50c is coupled to the one input terminal of the output rectifier module 50c (the node 133 of FIG. 1). The cathode of the diode 540 is coupled to one terminal of the diode 542 and the inductor 544. The other terminal of the inductor 544 is coupled to one terminal of the capacitor 546 and the load 548. The anode of the diode 542 is coupled the other terminal of the capacitor 546 and the load 548, which is not coupled to the inductor 544, is coupled to the other input terminal of the output rectifier module 50c (the node 135 of FIG. 1).

Figure 6:
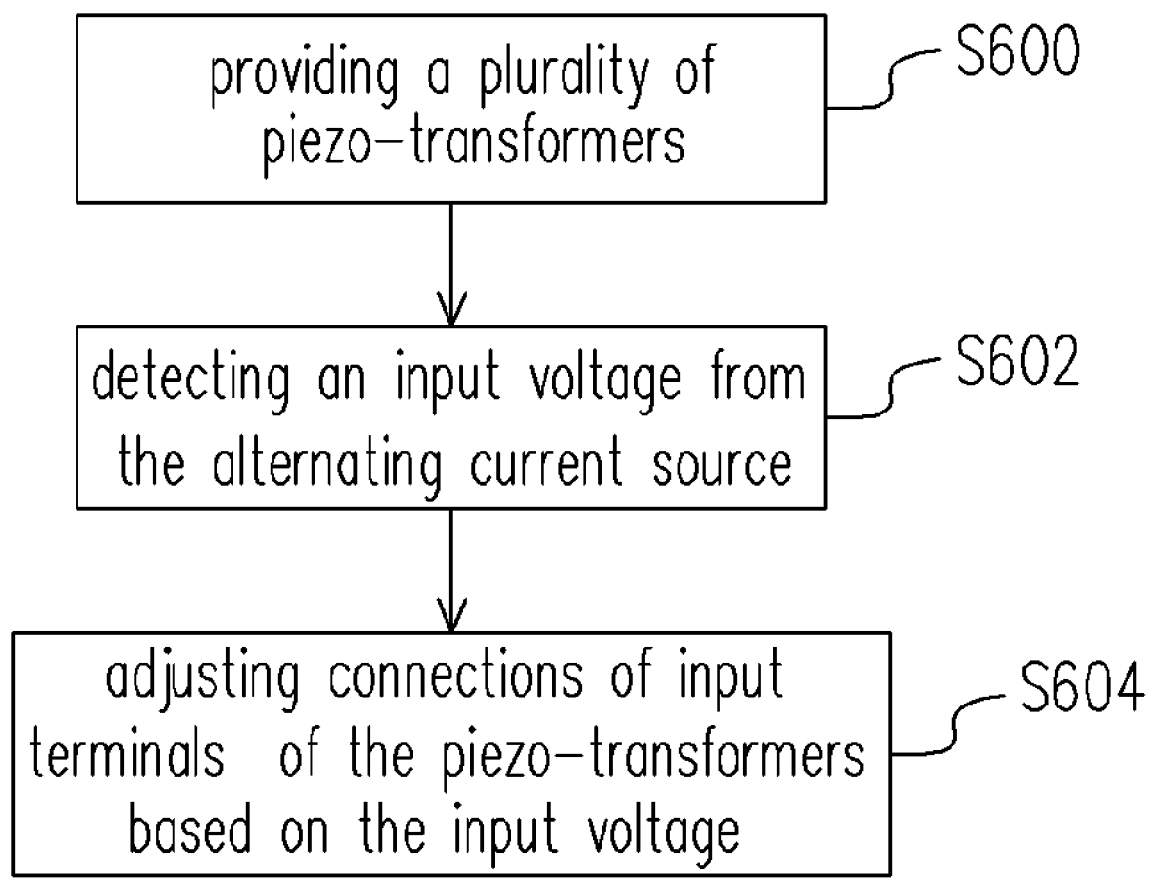
FIG. 6 shows the operation flow chart of the A/D converter with adjustable internal connection in accordance with an embodiment of the present invention.

In addition, the present invention also provides a method of operating the A/D converter with adjustable internal connection of the present invention. FIG. 6 shows the operation flow chart of the A/D converter with adjustable internal connection in accordance with anembodiment of the present invention. In the first step(S600), a plurality of piezo-transforming devices is provided. In the second step (S602), an input voltage from the alternating current source is detected. Finally, in step (S604), an connection of input terminals of the plurality of piezo-transforming devices is adjusted based on the input voltage to obtain an input/output voltage ratio of the plurality of piezo-transforming devices inverse-proportional to the input voltage.

As described above, according to an embodiment of the present invention, a plurality of piezoelectric transformers, connected in series and in parallel, are utilized to provide the variance of the input/output voltage ratio in order to obtain the same or a similar voltage even if the input voltage were different. Hence, the t requirement of a complicated circuitry such as active-clamp half-bridge circuit, pulse frequency modulation (PFM) or pulse width modulation (PWM) feedback controller to control the output can be effectively avoided. Therefore, the A/D converter with adjustable internal connection of the present invention is cost-effective and suitable for mass-production.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

The invention claimed is:

1. An A/D converter with adjustable internal connection, for converting an alternating current source to a direct current source, comprising:
   a rectifier driver module, adapted for rectifying an input voltage from said alternating current source and converting said input voltage to a corresponding driver voltage;
   a transformer module, including:
   a plurality of piezoelectric transformers, each of said plurality of piezoelectric transformers having two input terminals and two output terminals, said two output terminals of said plurality of piezoelectric transformers being connected in parallel to serve as two output terminals of said transformer module; and
   a control module, adapted for receiving said driver voltage, wherein said control module responsive to said input voltage and thereby adjust a connection between said input terminals of said plurality of piezoelectric transformers; and
   an output rectifier module, adapted for receiving an output voltage from saidtwo output terminals of said transformer module, and rectifying said output voltage from saidtwo output terminals to output said direct current source.

2. The converter of claim 1, wherein said transformer module includes:
   a first piezoelectric transformer, having a first positive input terminal, a first negative input terminal, a first positive output terminal and a first negative output terminal; and
   a second piezoelectric transformer, having a second positive input terminal, a second negative input terminal, a second positive output terminal and a second negative output terminal;
   wherein said first positive output terminal is coupled to said second positive output terminal, and said first negative output terminal is coupled to said second negative output terminal.

3. The converter of claim 2, wherein said control module includes:
   a first switch, coupled between said first positive input terminal and said second positive input terminal;
   a second switch, coupled between said first negative input terminal and said second negative input terminal; and
   a third switch, coupled between said first negative input terminal and said second positive input terminal;
   wherein when said input voltage reaches a first predetermined level, said first and secondswitches are turned off and said third switch is turned on; when said input voltage reaches a second predetermined level, said first and secondswitches are turned on and said third switch is turned off.

4. The converter of claim 1, wherein said rectifier module includes:
   a rectifier, adapted for rectifying said input voltage to obtain a rectified voltage; and
   a driver, including:
   a first inductor, said first inductor having a first terminal receiving said rectified voltage and a second terminal coupled to input of said control module;
   a second inductor; and
   a driver switch;
   wherein said second inductor comprises a first terminal for receiving said rectified voltage and a second terminal is coupled to a first terminal of said driver switch, and a second terminal of said driver switch is coupled to input of said control module, and wherein said driver switch is turned on/off responsive to said input voltage.

5. The converter of claim 1, further comprising a voltage detector module for detecting said input voltage and sending a control signal to said control module based on said input voltage to adjust said connection of said plurality of piezoelectric transformers.

6. A method for operating an A/D converter with adjustable internal connection, for converting an alternating current source to a direct current source, comprising:
   a. providing a plurality of piezo-transforming devices;
   b. detecting an input voltage from said alternating current source; and
   c. adjusting an connection of input terminals of said plurality of piezo-transforming devices based on said input voltage to obtain an input/output voltage ratio of said plurality of piezo-transforming devices inversely proportional to said input voltage.

7. The method of claim 6, wherein said plurality of piezo-transforming devices are a plurality of piezoelectric transformers.

8. The method of claim 6, wherein said step c further comprising:
   when said input voltage is higher than a predetermined voltage, the connected of the number of said input terminals of said plurality of piezo-transforming devices is adjusted in a manner that an increased number of the input terminals of said plurality of piezo-transforming devices are connected in series; and
   when said input voltage is lower than said predetermined voltage, the connection of the number ofsaid input terminals of said plurality of piezo-transforming devices are adjusted in a manner that an increased number of the input terminals of said plurality of piezo-transforming devices are connected in series.

* * * * *